UNITED STATES PATENT OFFICE.

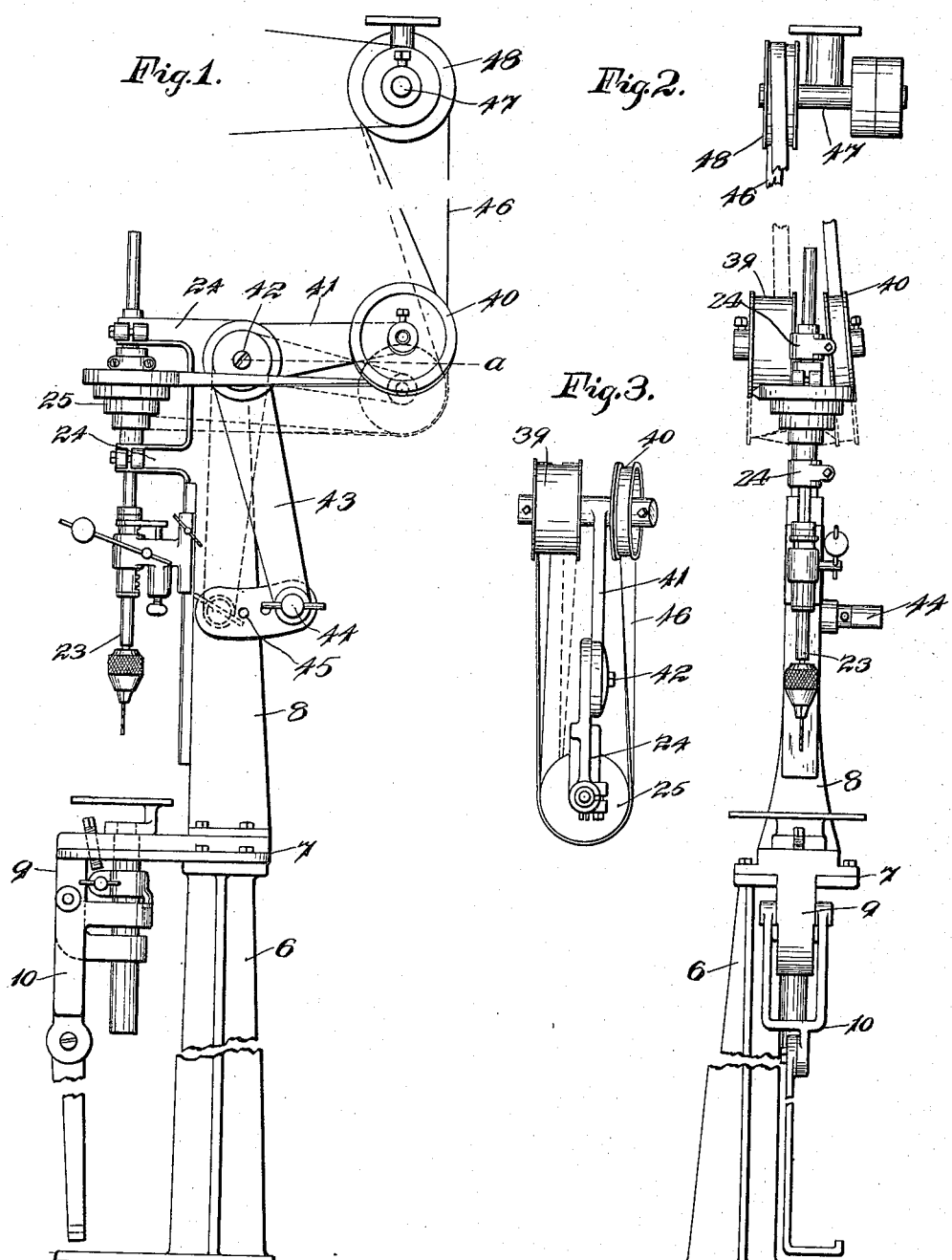

HARRY P. TOWNSEND, OF WATERBURY, CONNECTICUT.

GEARING.

1,155,847.

Specification of Letters Patent. Patented Oct. 5, 1915.

Application filed September 17, 1910. Serial No. 582,446.

*To all whom it may concern:*

Be it known that I, HARRY P. TOWNSEND, a citizen of the United States, and a resident of Waterbury, in the county of New Haven and State of Connecticut, have invented a new and Improved Gearing, of which the following is a specification.

While my invention relates generally to drill presses, it is especially applicable to that class known as vertical drills, and the object of my invention is to provide a device having numerous novel features of advantage and utility.

One form of device in the use of which the objects herein set out may be attained is illustrated in the accompanying drawings in which—

Figure 1 is a view in side elevation of a drill press embodying my invention. Fig. 2 is a front view of the same. Fig. 3 is a top plan view of the upper portion of the machine, the base and lower parts being omitted for sake of clearness.

The invention herein illustrated and described is not confined in its use to any specific machine, but as it readily adapts itself for use in a drill press of the vertical type I have selected such for the purpose of illustration and description herein.

In the accompanying drawings the numeral 6 denotes the base, that may be of any approved form and material, having a table 7 at its upper end, and also supporting a column 8. A bracket 9 depends from the under side of the table and supports a pivoted feed lever 10.

A drill spindle 23 is mounted in spindle supporting arms 24 projecting from the column 8. In machines of this class it is not always desirable to feed the work to the spindle, and I therefore provide means for also feeding the spindle toward the work. This, however, of itself forms no part of my invention, and a detailed description will therefore be omitted herein, it being sufficient to state that the spindle is longitudinally movable in its supporting arms by mechanism well known in devices of this class, a cone pulley 25 being splined to the spindle between the arms 24.

My invention contemplates a structure in which the length of the horizontal run of the belt between its points of contact with the cone pulley and idler pulleys to be hereinafter described remains practically unchanged as it is shifted from one to another face of the cone pulley. The width of the faces of the cone pulley being a factor that determines the amount of vertical movement of the horizontal run of the belt in a change from one to another face of the pulley, it being of course understood that the belt is of a width to properly fit the faces of the cone pulley, I so proportion the width of adjacent steps to the difference in diameter between said steps that, aside from the necessary change in the length of the vertical run of the belt, the difference in length is taken care of and the tension always maintained.

Two idlers 39—40, the former having a face wider than the belt, and the latter a face substantially the same as that of the belt, are mounted to move practically in a straight line in a vertical direction, the most satisfactory construction including an angular lever, one arm of which supports said idlers. This lever is pivotally mounted on the column 8 and is so disposed that the extreme movement of the pulleys is from a position a short distance from a horizontal line passing through the pivot 42 to a position on the opposite side of and the same distance from said line which is indicated by the letter $a$, as illustrated in Fig. 1 of the drawings. The arm 43 of the lever extends along the side of the column 8 its lower end being provided with a lock screw 44 arranged to enter locking recesses 45 in the side of the column.

A belt 46, which as above described is of a width to properly fit the faces of the cone pulley, passes from a driving pulley 48 on a counter shaft 47 driven in any suitable manner, and it will be noted, from an examination of Fig. 1, that when the belt is moved from one step to another of the pulley the length of its horizontal run from the points where it makes contact with the cone pulley to the idlers remains unchanged, the width and depth of successive steps on the cone pulley being so proportioned as to compensate for any difference in the length of the belt not otherwise provided for.

I do not limit my invention to a machine constructed specifically in accordance with the foregoing illustration and description of the preferred form, as these may be departed from to a greater or less extent and yet be within the scope and intent of the invention.

It will be noted that in changing from a lower to a higher speed the belt is wrapped to a greater extent around the cone pulley. This increase of belt contact from a higher to a lower speed caused by the arrangement of the idlers and other mechanism enables an increased power to be obtained on the lower speeds where such is desirable.

I claim:—

1. In combination with a horizontally-arranged shaft, a supporting frame located below the level of said shaft, a spindle with its axis vertically disposed mounted in said frame, a cone pulley arranged on said spindle, a bent stub shaft mounted on said frame, idlers mounted on the bent shaft in fixed relative positions with the axis of one disposed at an angle relative to the axis of the other, a single-faced pulley upon said horizontal shaft, a driving belt passing over said pulleys and idlers, and means for changing the position of the idlers relative to the frame to direct the belt to a selected face of the cone pulley.

2. In combination with a horizontally-arranged shaft, a supporting frame located below the level of said shaft, a spindle with its axis vertically disposed mounted in said frame, a cone pulley secured to said spindle, a stub shaft having an offset end mounted on said frame, a pair of idlers adjustably mounted on said stub-shaft in fixed relative positions with the axis of one angularly-disposed relative to the axis of the other; a driving belt passing over said pulley, idlers and horizontally-arranged shaft, one of said idlers being mounted with its plane arranged parallel to a plane passing vertically through the axis of the spindle directly from the front to the back of the frame.

3. In a drill press, a supporting frame, a spindle mounted therein with its axis vertically arranged, a stepped cone pulley secured to the spindle, a power shaft, a single-faced power pulley on the power shaft, rigidly-connected idlers adjustably mounted on the frame with the axis of one angularly-disposed relative to the axis of the other, the axis of the power pulley being parallel to the axis of one of the idlers, a driving belt passing directly over said cone pulley, idlers and power pulley, one of said idlers having its face located substantially at right angles to the direction of travel of the belt from the front of the frame to the rear thereof, and means for positioning the idlers with respect to the cone pulley.

4. In a drill press, a supporting frame, an overhead driving shaft, a vertical spindle mounted in said frame, a carrier pivotally mounted upon the frame with a handle extending to the front thereof, idler pulleys mounted on the carrier, a single-faced driving pulley mounted on said shaft with its axis arranged substantially in a plane at right angles to a plane passing directly from the front to the rear of the supporting frame and parallel to the axis of one of the idlers, said carrier being arranged to move the idlers in substantially a straight line parallel to the spindle, a stepped cone pulley mounted on the spindle, a driving belt passing over the cone pulley, idlers and single-faced driving pulley, the width of adjacent steps or faces of the cone pulley being proportioned to the difference in diameter of said steps to compensate for the change of positions of the idlers to maintain a taut stretch of the horizontal run of the belt.

HARRY P. TOWNSEND.

Witnesses:
JAMES J. CAFFREY,
HAROLD W. CAMPBELL.

Copies of this patent may be obtained for five cents each, by addressing the "Commissioner of Patents, Washington, D. C."